C. B. HAYWARD.
DISH WASHING MACHINE.
APPLICATION FILED JUNE 1, 1917.
1,264,792.
Patented Apr. 30, 1918.
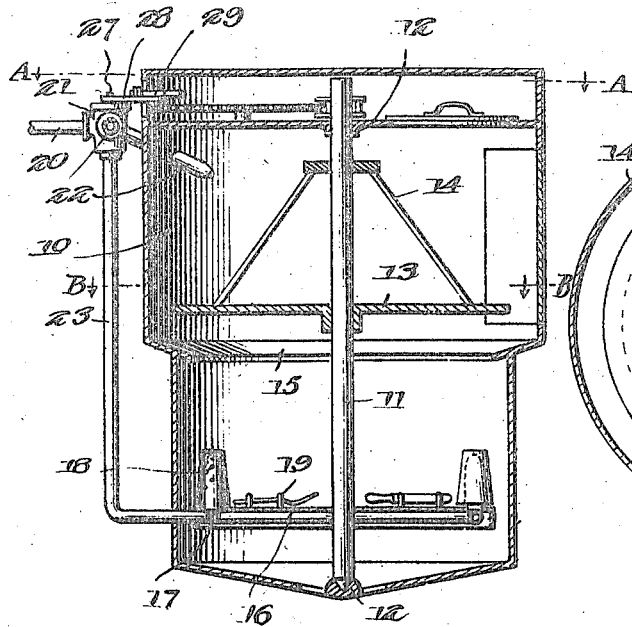
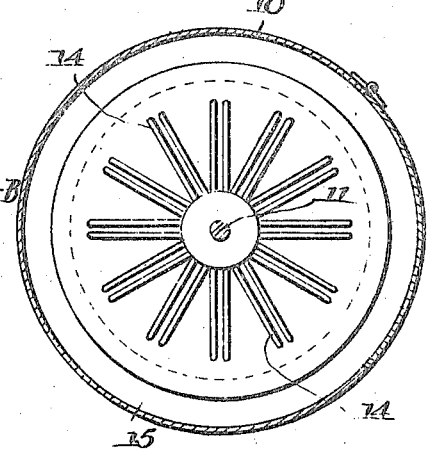
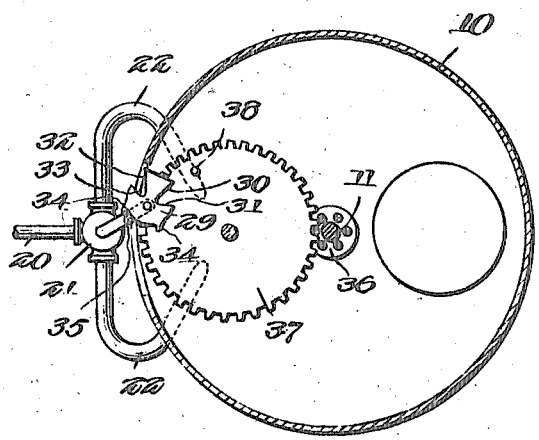
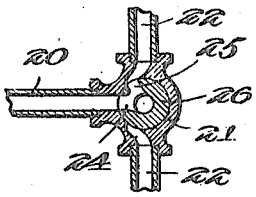
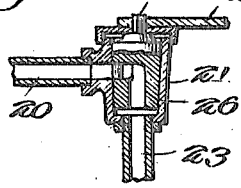
WITNESSES
A. V. Doyle
H. E. Veitch
INVENTOR
C. B. Hayward,
BY Victor J. Evans
ATTORNEY

UNITED STATES PATENT OFFICE.

CHAUNCEY B. HAYWARD, OF JERSEY CITY, NEW JERSEY.

DISH-WASHING MACHINE.

1,264,792.      Specification of Letters Patent.    Patented Apr. 30, 1918.

Application filed June 1, 1917. Serial No. 172,268.

*To all whom it may concern:*

Be it known that I, CHAUNCEY B. HAYWARD, a citizen of United States of America, residing at Jersey City, in the county of Hudson and State of New Jersey, have invented new and useful Improvements in Dish-Washing Machines, of which the following is a specification.

This invention relates to washing machines and more particularly to the class of machines for washing dishes and other table ware.

The primary object of the invention is the provision of a machine of the class described which is provided with a rotary plate rack adapted to be operated under the action of streams of water directed alternately against the plates placed thereon through opposed nozzles whereby the rack is caused to revolve in opposite directions successively, in order that the dishes may be cleansed on both their front and rear faces.

Another object of the invention is the provision of a device of the character described which includes a casing having a stationary tray mounted in its lower portion directly below the revolving plate rack, said tray being provided with a plurality of upstanding nozzles having connection with the suitable source of supply whereby the interior of the glasses or cups placed thereon will be thoroughly cleansed while the spray from the dish rack washes the exterior.

Another object of the invention is the provision of a means for automatically reversing the flow of the water from the nozzles which consist of a pinion mounted on the shaft of the dish rack, said pinion meshing with a gear wheel having a projection which is adapted to contact with a trip disk pivoted to an operating arm attached to the valve stem, the core of which is adapted to alternately bring the nozzles into communication with the supply pipe.

A still further object of the invention is the provision of a casing having an inclined annular baffle wall directly below the rotary plate rack, the purpose of which is to more forcibly project the spray from the plate rack against the exterior of the glasses and cups.

Another object of the invention is the provision of a series of retainers for silver ware, said retainers being provided upon the stationary tray.

A still further object of the invention is the provision of the device of the character described simple in construction, thoroughly reliable and efficient in operation, inexpensive to manufacture and which minimizes the amount of water necessary to cleanse the table ware by utilizing the same water for different articles, successively.

Other objects and advantages will be readily apparent when the nature, purpose and operation of the machine is better understood from reading of the specification and claims on the accompanying drawings: of which—

Figure 1, is a vertical sectional view thereof.

Fig. 2, is a horizontal section on the line A—A, of Fig. 1

Fig. 3, is a horizontal section on the line B—B, of Fig. 1.

Fig. 4 is a detail cross sectional view through the valve.

Fig. 5, is a detail vertical section thereof.

Referring to the drawings by numerals, 10, designates a casing having a vertical shaft 11, mounted therein for rotation in the bearings 12. A plate rack 13, is secured to the shaft and adapted to rotate therewith, said plate rack being provided with a plurality of plate retaining members 14, said members being so constructed as to accommodate themselves to saucers or soup plates when placed therebetween. An annular inclined baffle 15, is provided on the sides of the casing immediately below the revolving rack and a stationary tray 16, is supported in the lower portion of the casing. An annular feed pipe 17, is arranged beneath the tray and has a plurality of upstanding perforated nozzles 18, projecting therefrom, said nozzles adapted for the reception of glasses or cups which are placed in inverted position thereon. A plurality of crimped wires 19, are provided transversely of the tray 16, to receive the usual silver ware. Arranged at one side of the casing 10, is a supply pipe 20, provided with a three way valve 21. A pair of nozzles 22, are secured to the opposite sides of the valve projecting angularly through the casing 10. A pipe 23, connects with the lower portion of the valve and communicates with the feed pipe 17. The construction of the valve core as shown in Fig. 5, is such that the supply pipe 20, is constantly in communication with the pipe 23, while the branches 24, and 25, of the core 26, alternately cause the supply pipe to communicate with the nozzles. Secured to the core and extending upwardly through the valve casing is a stem 27, having an arm 28. Pivoted to the free extremity of the arm 28, is a trip disk 29, which is notched to provide the engaging faces 30, 31, 32 and 33, and is also provided with the lugs 34. The lugs 34, serve to limit the rotation of the disk by contacting with the stop pins 35, which are arranged on the arm 28. A pinion 36, is secured to the shaft 11, above the plate rack and meshes with a gear wheel 37, having an upstanding pin 38, provided adjacent its periphery.

In operation of the machine, the water or other cleansing fluid is admitted to the valve 21, from the supply pipe 20, and enters the left hand nozzle 22, through which it is projected against the plates in the rack 13, causing the same to rotate toward the left. When the rack has turned a pre-determined number of times, depending upon the ratio of the gears, the gear wheel 37, will have made one complete revolution thus bringing the pin 38, into contact with the face 30, of the trip disk which will turn on its pivot until one of the lugs 34, contacts with the stop 35, on the arm 28, thereby causing the arm to swing the stem 27, and the core 26, until the branches are reversed thus closing communication between the supply pipe and the left hand nozzle and causing water to flow through the right hand nozzle. The momentum of the plate rack will cause the pin 38, to pass off and slightly beyond the face 30, of the trip disk during the interval which occurs while the valve core is operated to direct the flow of water into the right hand nozzle. The trip disk is then re-set as the pin 38, in traveling back under the influence of the water, contacts with the outer extremity of the face 31, and when the pin 38, has traveled around its orbit, it will contact with the face 32, to cause a change in the direction of the flow of the water by operating as before described. From the foregoing description, it is thought that the nature, purpose and advantage of the machine will be readily understood and therefore a more extended description has been omitted.

What I claim is.

1. A dish washing machine comprising, a rotary plate rack, and mechanism actuated through the rack when the latter is in motion for alternately projecting water in opposite directions and against the rack as and for the purpose specified.

2. A dish washing machine comprising, a casing, a rotary plate rack mounted therein, a pair of opposed nozzles projecting into said casing adjacent to and toward the plate rack, a valved intake connecting said nozzles and means for automatically operating the valve to alternately project a stream of water from said nozzles against the plates supported in the rack, to cause the rack to respectively rotate in opposite directions.

3. A dish washing machine comprising a casing, a centrally arranged rotary shaft mounted therein, a plate rack secured thereto, means for alternately projecting water in opposite directions against the rack to cause the latter to rotate in opposite directions including a valved supply pipe, a pair of opposed nozzles extending from opposite sides of said valve and into said casing, a pinion on said rotary shaft, a gear meshing therewith, a projection on said gear, an operating arm on said valve, a trip disk pivoted for rotary movement to the free extremity of the arm, notches in said disk for engagement by the projection on the gear, lugs on said disk and a stop on the operating arm to limit the rotation of the disk.

In testimony whereof I affix my signature.

CHAUNCEY B. HAYWARD.